United States Patent [19]

Sutton

[11] 4,186,091
[45] Jan. 29, 1980

[54] WATER INTAKE SCREEN INSTALLATION AND METHOD OF STRAINING WATER

[75] Inventor: William M. Sutton, North Wales, Pa.

[73] Assignee: FMC Corporation, San Jose, Calif.

[21] Appl. No.: 928,769

[22] Filed: Jul. 27, 1978

[51] Int. Cl.² ............................ B01D 33/22; B01D 35/22
[52] U.S. Cl. ........................................... 210/77; 210/82; 210/158; 210/160
[58] Field of Search .................... 210/77, 82, 154, 155, 210/158–160, 324, 327, 333 R, 391, 393

[56] References Cited

U.S. PATENT DOCUMENTS

| | | | |
|---|---|---|---|
| 1,902,248 | 3/1933 | Knight | 210/154 X |
| 2,804,209 | 8/1957 | Carlton et al. | 210/158 |
| 3,242,872 | 3/1966 | Thompson | 210/158 X |
| 3,868,324 | 2/1975 | Taylor et al. | 210/158 |
| 4,064,048 | 12/1977 | Downs et al. | 210/160 |

*Primary Examiner*—William A. Cuchlinski, Jr.
*Attorney, Agent, or Firm*—J. W. Edwards; J. F. Verhoeven

[57] ABSTRACT

A water intake screen installation has a traveling water screen unit, that is positioned between a water intake and a stream of water flowing in a channel, to strain a quantity of water diverging from the channel stream towards the water intake. The screen unit includes an endless belt strainer in the form of a loop and a drive for revolving the strainer. The strainer has a screening surface, that extends in a predetermined direction of stream flow in the channel and in an upwardly direction. Means are provided for directing a backwash current, through the screening surface, towards the stream of water flowing in the channel, at an elevation below the stream surface. Material, such as refuse and aquatic life, retained on the screening surface can be dislodged by the backwash current. This current forces such material backwardly from the screening surface, into the stream of water flowing in the channel, to be carried away therewith. Also disclosed is a method of straining water from a stream with the above described screening installation that enables water to be drawn from the stream without the removal of aquatic life and refuse.

16 Claims, 13 Drawing Figures

FIG_1

FIG_4

FIG_2

FIG_11

FIG_12

FIG_13

WATER INTAKE SCREEN INSTALLATION AND METHOD OF STRAINING WATER

BACKGROUND OF THE INVENTION

1. Field of the Invention

This invention relates to a water intake screen installation having an endless belt strainer that is cleaned by a submerged backwash current.

2. Description of the Prior Art

U.S. Pat. No. 2,804,209, that issued Aug. 27, 1957, to Carlton et al, shows a traveling water screen unit that removes both refuse and fish from a flowing stream of water. Above the surface of the stream, refuse is dislodged from the screen and directed by a water spray into a disposal trough that conveys the refuse to a location where it is disposed of in a non-polluting manner. Another water spray flushes fish from holding pans into another trough whereby the fish are returned to the stream at a remote location.

Energy is required to lift refuse, water and aquatic life from a stream of water. Such refuse removed from the water must be disposed of in a non-polluting manner such as burning or burying. Aquatic life, that is removed with water from the stream in a holding pan, then flushed from the pan into a trough, and later returned by the trough to the stream at a remote location, is subjected to a hazardous journey. The impact force of flushing water sprays can injure aquatic life.

SUMMARY OF THE INVENTION

Objects of the present invention include providing an improved water intake screen installation, minimizing the required earth and foundation work for a water intake screen installation, increasing the straining capacity of a screen unit, reducing installation costs, avoiding refuse disposal problems, protecting aquatic life in a source of water, and cleaning material from a traveling water screen unit without removing such material from the water.

A water intake screen installation has a channel for guiding a stream of water to flow in a predetermined direction. A water intake is provided for receiving a quantity of water diverging from the channel stream. A traveling water screen unit for straining the diverging water is positioned between the water intake and the stream of water flowing in the channel. This unit has an endless belt strainer, in the form of a loop, with a screening surface that extends in the predetermined direction of stream flow and in an upwardly direction. The screen unit has a drive for vertically revolving the endless belt strainer. Means are provided for directing a backwash current through the screening surface, towards the stream of water flowing in the channel, at an elevation below the stream surface. Material retained on the screening surface can be dislodged by the backwash current and forced backwardly from the screening surface into the stream, to be carried away therewith.

According to another aspect of the invention, there is provided a method of straining water from a stream in a manner to minimize the removal of aquatic life and refuse from the stream. This method includes the steps of guiding a stream of water to flow in a predetermined direction within a channel, drawing a quantity of water to diverge laterally from the predetermined direction of flow of the channel stream to a water intake, straining the diverging quantity of water with a screening surface of an endless belt strainer, revolving the endless belt strainer to vertically shift the screening surface from a location through which the diverging water flows to an adjacent location superposed to the diverging water flow, and directing a backwash current through the screening surface at the adjacent location superposed to the diverging water flow in a direction towards the stream of water flowing in the channel and in the opposite direction from the direction of flow of the diverging water flow at an elevation below the stream surface. Thus, material retained on the screening surface can be dislodged by the backwash current and forced backwardly from the screening surface into the stream of water flowing in the channel, to be carried away therewith.

DESCRIPTION OF THE PREFERRED EMBODIMENT

Figure 1:
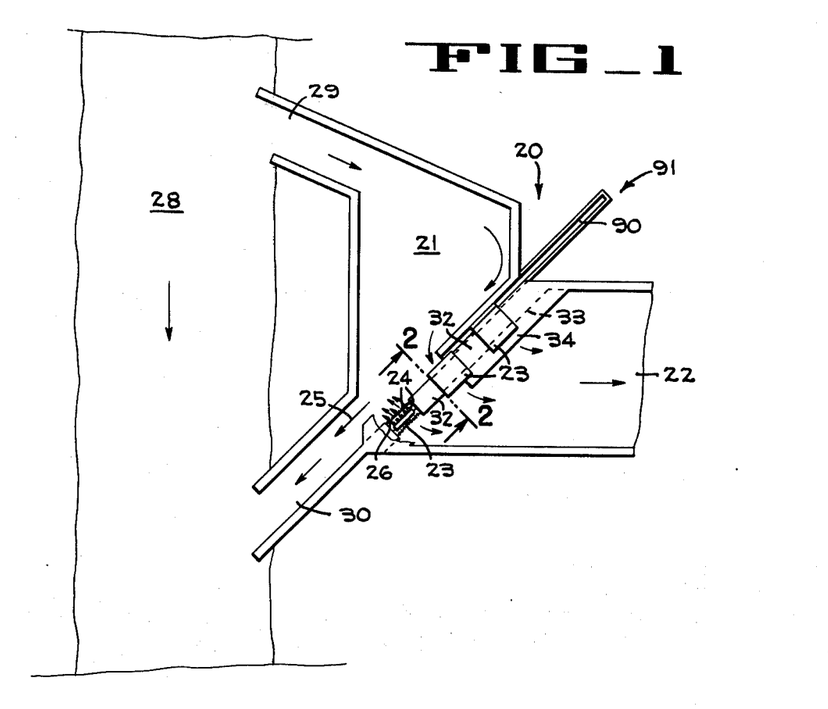
FIG. 1 is a plan view, with portions broken away to show underlying structure, of a water intake screen installation embodying the present invention.

Looking now at FIG. 1, a water intake screen installation 20 has a channel 21 and a water intake 22, with a series of traveling water screen units 23 positioned therebetween. Means, such as a plurality of jet nozzles 24, are provided for directing a backwash current through an associated screen unit, in a direction from the water intake towards the channel. A stream of water flows through the channel, as indicated by the arrow 25, in a predetermined direction. Each screen unit has a screening surface 26 that extends both upwardly and laterally in the predetermined direction of stream flow. Material retained on the screening surface can be dislodged by the backwash current below the surface of the stream. Such material is forced backwardly from the screening surface, into the stream of water flowing in the channel, to be carried away therewith.

The channel 21 diverts water from a source 28. This channel guides the water to flow in a stream, past the traveling water screen units 23, in a predetermined direction indicated by the arrow 25. Returning to the source, the channel guides the stream of water to flow thereto. The source can be a body of water that is flowing like a river or stream or else it can be standing like a lake or ocean. The channel has an inlet portion 29 and an outlet portion 30. If there is a sufficient different in elevation between the inlet portion and the outlet portion, the stream of water will flow by gravity through the channel. Without such difference in elevation, pumps can be installed at the inlet portion to provide a sufficient pressure head for the stream of water to flow through the channel, with both sufficient velocity and quantity of flow to carry away material removed from the screening surface 26.

The water intake 22 is an open flume that extends from the channel 21 to a water using facility (not shown). Such a water using facility can be an electric generating station, an industrial plant, a chemical processing plant, a plastic manufacturing plant, a pulp and paper mill, a food processing plant, a flood control pumping station, an irrigation project, a sewage treatment plant, a fish hatchery, or a water treatment plant. Preferably, the water intake flume has a slope that enables a quantity of water, equal to the demand of the water using facility, to flow thereto by gravity, at a desired velocity.

Figure 4:
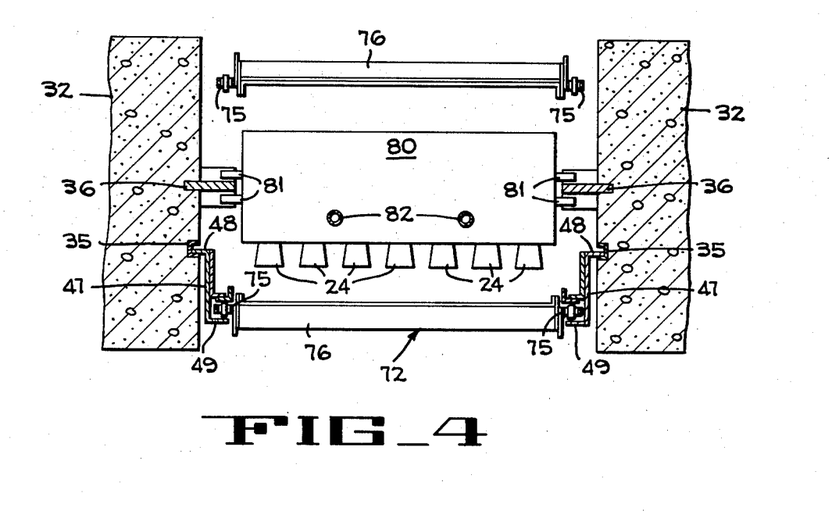
FIG. 4 is a horizontal section taken on the line 4—4 of FIG. 3.

The traveling water screen units 23 are aligned in a row that extends along one side of the channel 21. Interposed between adjacent screen units are columns 32 that project upwardly from the bottom of the channel. At each end of the screen unit now is an abutment 33, adjoining the sidewalls of both the channel and the water intake. The columns and the abutments support at their top portions a walkway 34 that has rectangular openings therein for receiving portions of the traveling water screen units. Guideways 35, as shown in FIG. 4, extend vertically of the columns and abutments, at opposite sides of the traveling water screen units. These guideways can be embedded in the abutments or columns, as shown, or else the guideways can be anchored to the columns and abutments. Similarly, vertical guides 36 are embedded in the columns and abutments on opposite sides of each screen unit. The traveling water screen units are lowered into place within the guideways.

Figure 2:
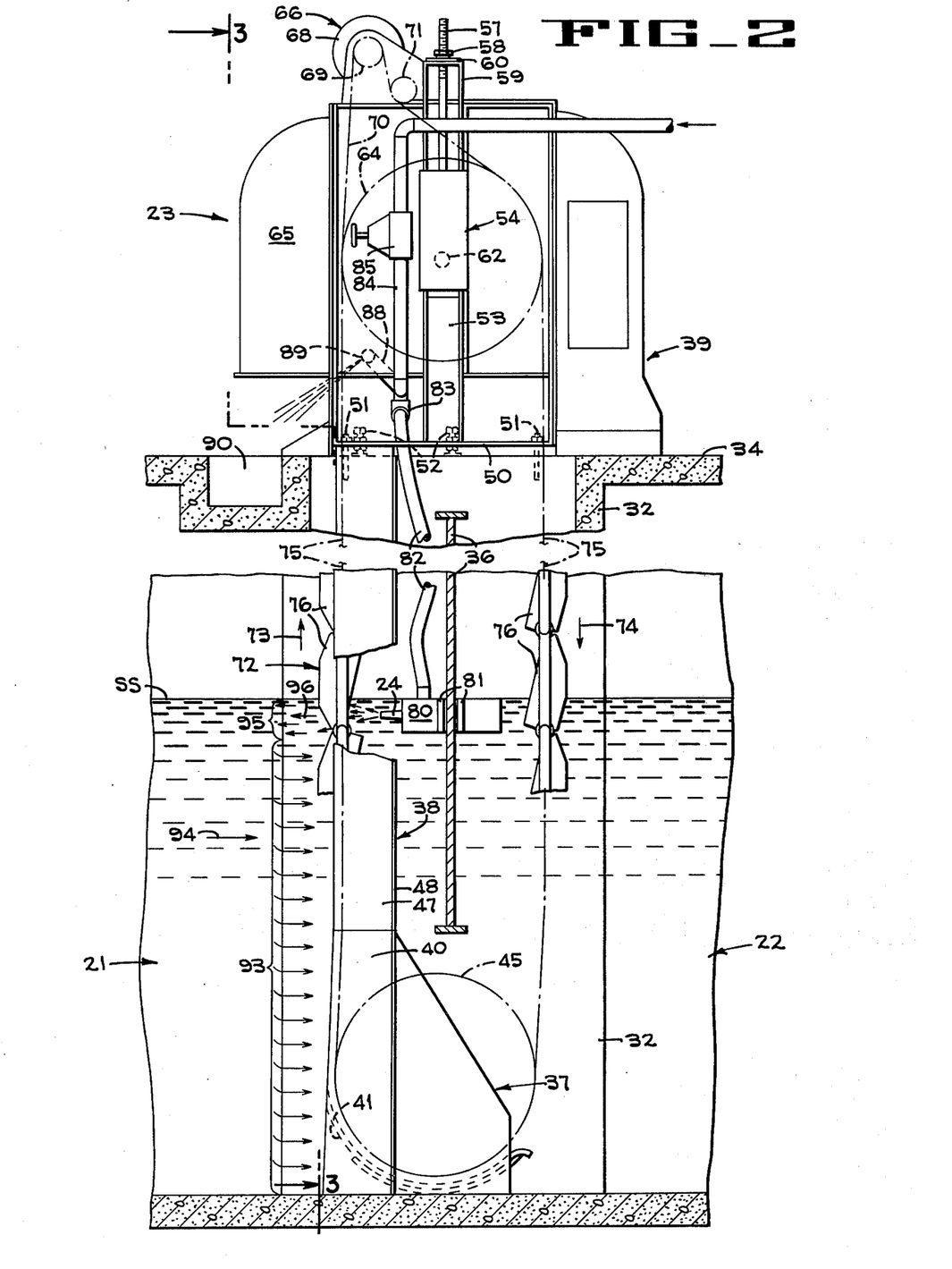
FIG. 2 is a vertical section taken on the line 2—2 of FIG. 1, with parts being broken away.
Figure 3:
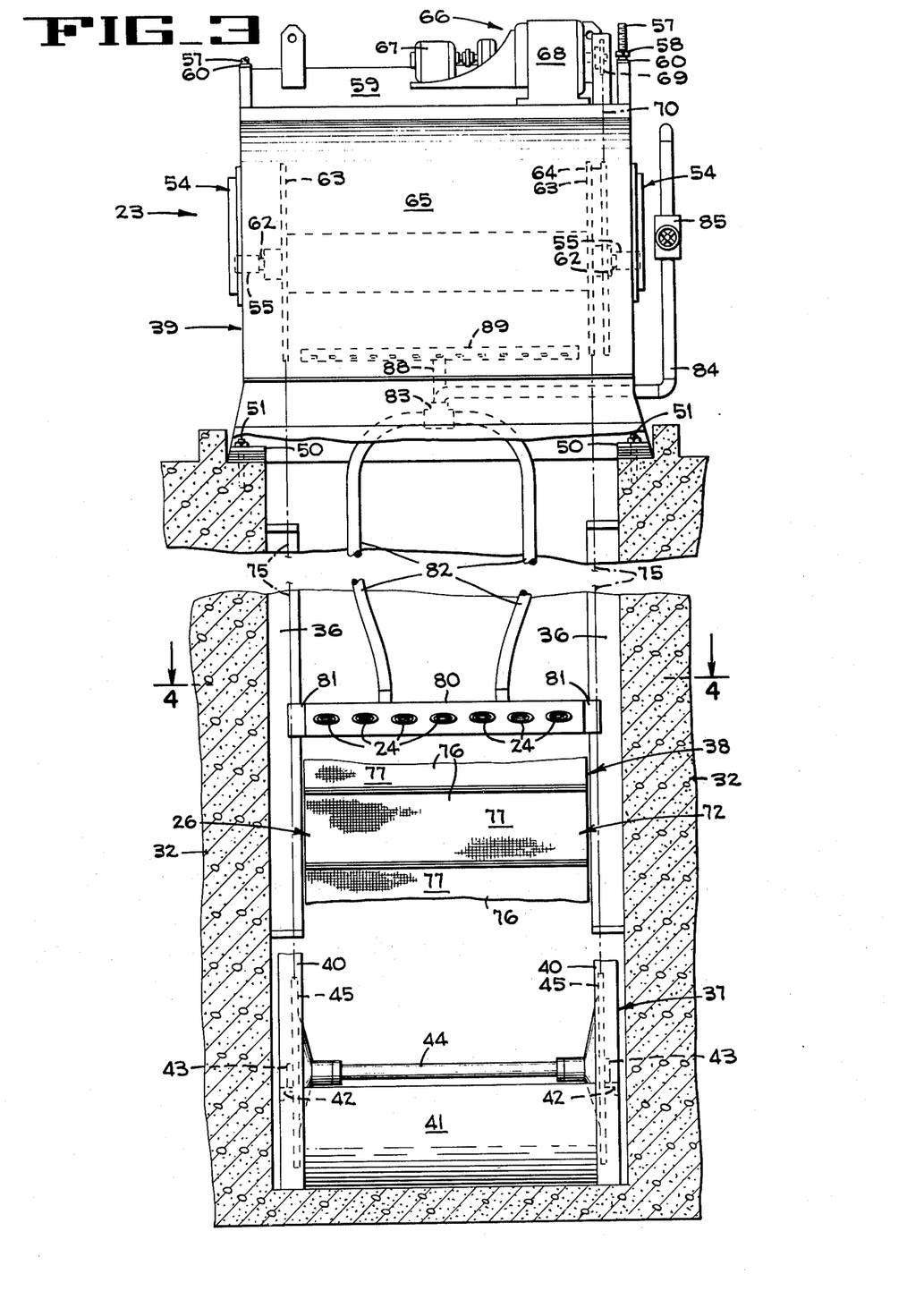
FIG. 3 is a vertical section taken on the line 3—3 of FIG. 2, with parts being broken away.

With reference to FIGS. 2 and 3, the traveling water screen units 23 are standard commercial items, such as manufactured by the Material Handling Systems Division of FMC CORPORATION, 3400 Walnut Street, Colmar, Pennsylvania 18915. Such units are of the thruflow type designated as Model 45A. Each traveling water screen unit has a frame that includes a boot section 37, an intermediate section 38, and a head section 39. The boot section has a pair of parallel uprights 40 that fit within the guideways 35. A seal 41 extends laterally between the lower portions of these uprights to prevent refuse from passing beneath the screening surface 26. A bracket 42 is mounted on each upright side facing inwardly of the screen unit. Each bracket supports a bearing 43. These bearings journal the ends of a foot shaft 44 that extends therebetween. A pair of foot sprockets 45 having central hubs are mounted by the hubs upon the foot shaft. The hubs are keyed to the shaft so that the sprockets rotate with the shaft.

The intermediate section 38 has a pair of parallel uprights, as shown in FIGS. 2 and 4, that extend vertically along opposite sides of the traveling water screen units 23. The uprights are formed by welded structural shapes that have flanges 48 projecting laterally outward into the guideways 35 to seal between the screen unit and the guideways. The flanges also hold the uprights in a given location relative to the guideways. Each upright defines a channel-like guide 49 facing inward laterally of the screen unit, as shown in FIG. 4.

Looking now at FIGS. 2 and 3, the head section 39 has a pair of base plates 50 that fit about anchor bolts 51 projecting upwardly from the columns 32 and the abutments 33. The base plates extend along the tops of the columns and the abutments, between the channel 21 and the water intake 22. Extending through each base plate are leveling screws 52 that contact the top of the underlying column or abutment for leveling the head section. A side frame member 53 extends vertically upward from the mid-portion of each base plate to support a take-up mechanism 54. This take-up mechanism includes a bearing 55 that is guided by a flanged block, not shown, for movement upon one of the frame members. The bearing is supported vertically by a threaded rod 57 and an adjusting nut 58. The bearings are aligned transversely of the screen unit 23. A transverse beam 59 (FIG. 3) provides lateral support between the side frame members. This beam has openings through which the threaded rods extend, and bearing plates 60 that are mounted on top of the transverse beam to support the adjusting nuts. Rotation of the adjusting nuts will cause vertical movement of both the threaded rods and the bearings, for adjusting the elevation of the bearings.

A head shaft 62 is journaled within the bearings 55. A pair of head sprockets 63 are mounted on the head shaft in substantial vertical alignment with the foot sprockets 45. A drive sprocket 64 is mounted to one of the head shaft at a location between one head sprocket and the adjacent side frame member 53. A housing 65 encloses the head shaft, the head sprockets, and the drive sprocket, that further define the head section 39.

A drive 66 is mounted upon the top of the housing 65. This drive includes a motor 67 that is suitably connected through a speed reduction unit 68 to a sprocket 69 over which a drive chain 70 is trained for rotating the drive sprocket 64. An idler sprocket 71 is mounted, as shown in FIG. 2, to maintain tension in the drive chain. An endless belt strainer 72 is trained about the head sprockets 63 and the foot sprockets 45 to form a vertical loop, as shown in FIG. 2. When the drive 66 rotates the head shaft 62, an upstream run of the endless belt strainer moves upwardly, as indicated by the adjacent arrow 73, and a downstream run of the endless belt strainer moves downwardly, as indicated by the adjacent arrow 74.

The endless belt strainer 72 has two endless chains 75 that are trained about the head sprockets 63 and the foot sprockets 45, as shown in FIG. 3. A plurality of screen trays 76 extend laterally between the two endless chains. Screen cloths 77 are mounted within the screen trays to provide an upwardly extending screening surface. Details of the screen trays and screen cloths are more fully described in U.S. Pat. No. 2,804,209 that issued to Carlton et al on Aug. 27, 1957. Such description is found in that patent at column 3, lines 8–29, and with reference to FIG. 7. That description is incorporated herein by this reference thereto.

In order to direct a backwash current through the screening surface 26 of the endless belt strainer 72, at a level just below a stream surface SS, the plurality of jet nozzles 24 are mounted upon a manifold portion of a floating carriage 80, as shown in FIGS. 2 and 4. A pair of fingers 81 project laterally outward from each end of the carriage to interdigitate with the vertical guides 36. Thus, the carriage is locked in a horizontal angular orientation, while it floats up and down, vertically. Water is supplied to the manifold portion of the carriage through a pair of flexible conduits 82 that are connected to a T-section 83. A conduit 84, having therein a shutoff valve 85, extends to a source of screened water.

An auxiliary cleaning station can be provided above the water level, but for most installations this will not be necessary. A pipe 88 projects from the conduit 84 to a stationary header 89 having a plurality of spray nozzles therein for directing jet sprays through the endless belt strainer 72 towards a disposal trough 90. This trough is an integral portion of the walkway 34 and extends beyond an abutment 33 to a suitable disposal site 91.

In operation, water flows from the source 28 through the channel 21, past the traveling water screen units 23 where a quantity of water diverges from the channel, through the screen units, to the water intake 22. The water remaining in the channel continues flowing therein, returning to the source 28. The diverging quantity of water 93 flows in the direction of an arrow 94 in FIG. 2. Such water passes through the upstream run of the endless belt strainer 72. Material, such as refuse and aquatic life, is retained on the upstream run, where it is carried upwardly, in the direction of the arrow 73. Just below the stream surface SS, the array of jet nozzles 24 direct a backwash current 95 through the screening surface 26 of the endless belt strainer, as indicated by the arrow 96, toward the channel 21. Material retained on the screening surface of the endless belt strainer is dislodged by the backwash current, and this material is forced backwardly from the screening surface, into the stream of water flowing in the channel, to be carried away therewith. Since the backwash current is submerged, the impact force upon aquatic life is softened.

Should any residue remain on the screening surface of the endless belt strainer, it will continue upwardly, in the direction of the arrow 73, to where the header 89 directs jet sprays through the screening surface, towards the disposal trough 90. Such material is then conveyed within the disposal trough to the disposal site 91.

Figures 5, 6, 8:
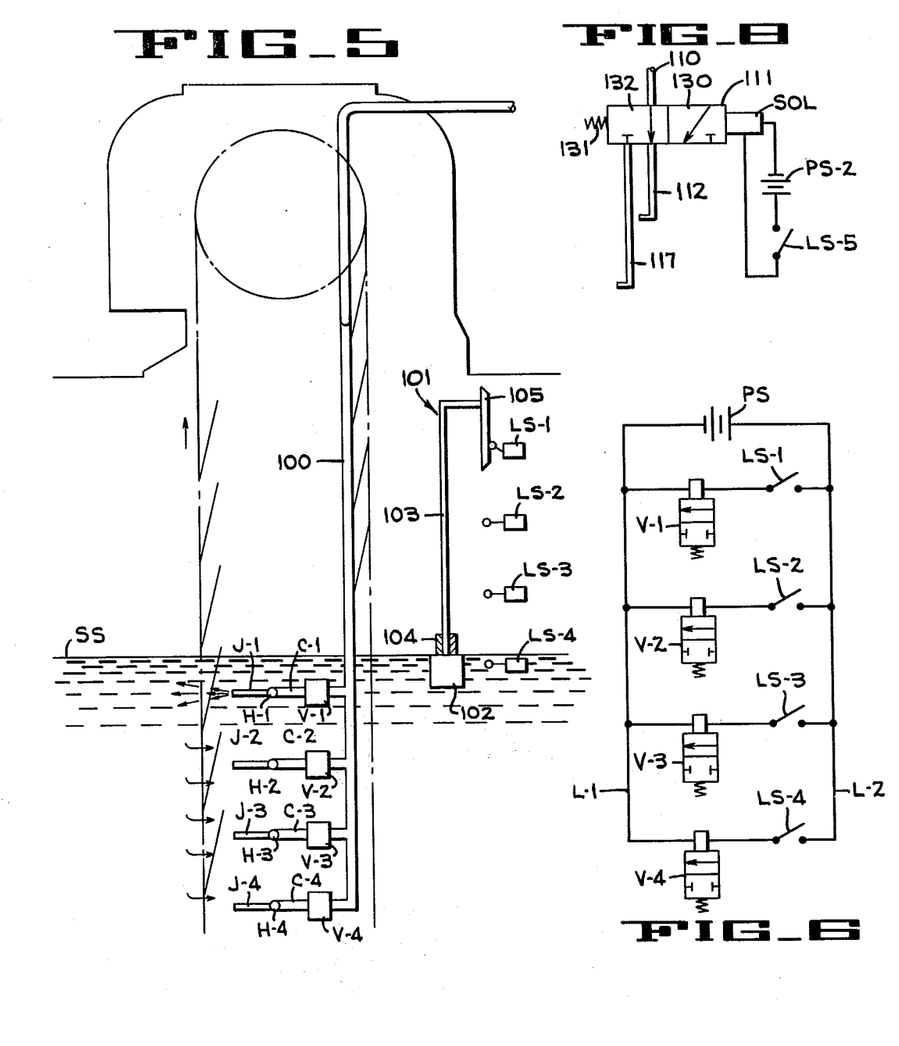
FIG. 5 is a diagrammatic side elevation illustrating a modified form of backwash flushing jets.
FIG. 6 is a schematic view of an electrical circuit that controls solenoid valves for actuating the backwash flushing jets shown in FIG. 5.
FIG. 8 is a schematic view of an electrical circuit that operates a solenoid controlled valve for actuating the backwash flushing jets shown in FIG. 7.

With reference to FIGS. 5 and 6, a modified form of backwash current directing jets are shown. The traveling water screen unit can be similar to the previously described unit 23 and the water screening installation can be similar to the previously described installation 20. Screened water under pressure is fed from a source, not shown, through a conduit 100, to a series of valves V-1, V-2, V-3 and V-4. These valves are fixed at vertically spaced locations, to suit the extreme variations in level of the stream surface SS. Conduits C-1, C-2, C-3 and C-4 project from the valves V-1, V-2, V-3 and V-4, respectively, to headers H-1, H-2, H-3 and H-4 that support arrays of Jets J-1, J-2, J-3 and J-4. A water level sensor 101 actuates a limit switch for operating a valve to supply screened water to the array of jets located both below and nearest to the stream surface SS. This water level sensor has a float 102 with a rod 103 extending upwardly therefrom, through a guide 104 that is anchored to an abutment. A contact 105 is fixed to the uppermost end of the rod for contacting vertically spaced limit switches LS-1, LS-2, LS-3 and LS-4.

Looking now at FIG. 6, the limit switch LS-1 is connected in series with a solenoid that controls the valve V-1. The limit switch LS-2 is connected in series with a solenoid that controls the valve V-2. The limit switch LS-3 is connected in series with a solenoid that controls the valve V-3. The limit switch LS-4 is connected in series with a solenoid that controls the valve V-4. These series circuits are connected in parallel between lines L-1 and L-2 that are connected to opposite poles of a power supply PS. When the water level sensor contact 105 closes one of these limit switches, the associated valve will be opened to allow water to flow through the associated conduit, header, and jet array.

Figure 7:
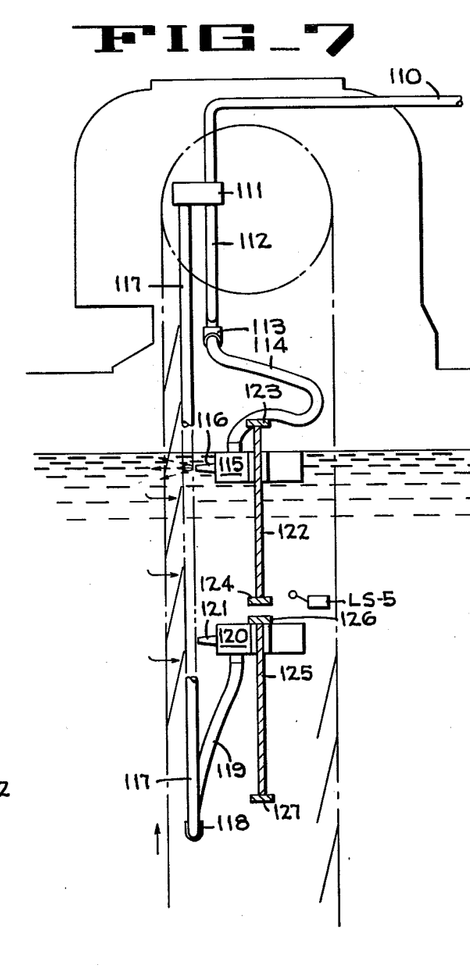
FIG. 7 is a diagrammatic side elevation illustrating another modified form of backwash flushing jets.

Another modified form of backwash current directing jets is illustrated in FIGS. 7 and 8. The installation can be similar to the water screening installation 20, and the screen units can be similar to the traveling water screen units 23. Screened water under pressure is fed from a source, not shown, through a conduit 110 to a directional valve 111. A first conduit 112 extends from the directional valve to a T section 113. A pair of flexible conduits 114 are attached to this T section. These flexible conduits extend to a manifold portion of a floating carriage 115 that supports an array of jet nozzles 116. A second conduit 117 extends from the valve 111 to a T section 118. A pair of flexible conduits 119 extend from the T section 118 to a manifold portion of a floating carriage 120 that supports an array of jet nozzles 121. The floating carriage 115 is superimposed above the floating carriage 120. A pair of vertical guides 122 are located at opposite ends of the floating carriage 115 for maintaining the horizontal angular orientation of the carriage as it moves vertically between end stops 123 and 124. A pair of vertical guides 125 are located at opposite ends of the floating carriage 120 for maintaining the horizontal angular orientation of the carriage between the guides, as the carriage moves vertically between the end stops 126 and 127.

The directional valve 111 is controlled by a solenoid SOL, as shown in FIG. 8. This solenoid is connected in series with limit switch LS-5 and a power supply PS-2. Thus, it will be seen that when the limit switch LS-5 is closed, the solenoid is actuated to move the directional valve to a position 130 so that water flows from the conduit 110 to the conduit 117. Upon deenergization of the solenoid, a spring 131 returns the directional valve to a position 132, wherein water flows from the conduit 110 to the conduit 112. Looking again at FIG. 7, it will be seen that the limit switch LS-5 is located in a position to be contacted by the floating carriage 115, when the carriage is in its lowermost position, adjacent the stop 124.

Lines and components of the electrical circuits, shown in FIGS. 6 and 8, that must be located beneath the stream surface, can be housed in water-proof casings and conduits.

Figures 9, 10:
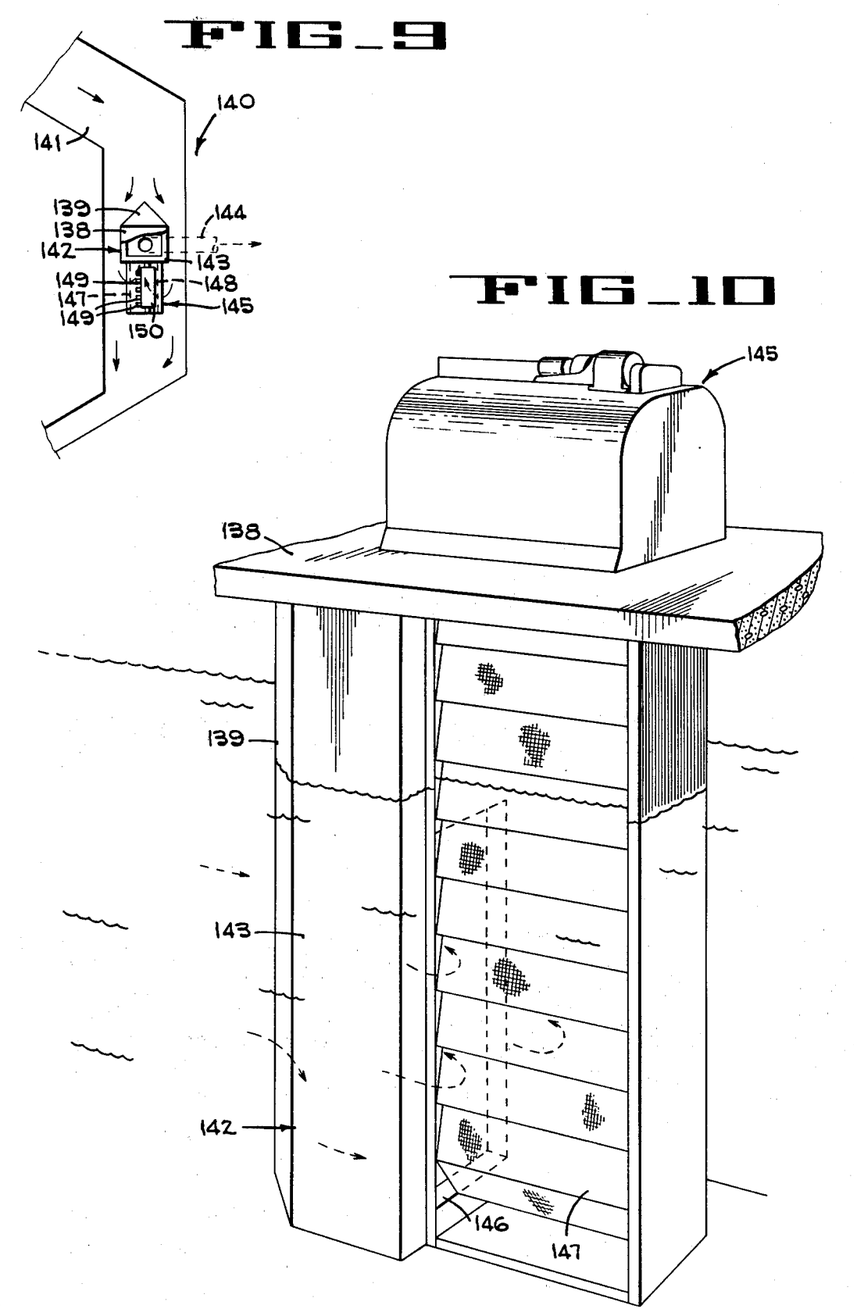
FIG. 9 is a plan view of a water intake screen installation illustrating a second embodiment of the invention.
FIG. 10 is a perspective view of a traveling water screen unit shown in FIG. 9.

Looking now at FIG. 9, a water intake screen installation 140 has a channel 141, and a water intake 142 is located within the channel. This water intake has a collector well 143 and a clear water conduit 144 extending from the collector well to a water using facility, not shown. A platform 138 is supported on top of the collector and a diverter cap 139 is positioned at the upstream side of the collector well. A traveling water screen unit 145 is positioned adjacent the downstream side of the collector well. A rectangular opening 146, as shown in FIG. 10, is provided within the collector well. The screen unit has an ascending run portion 147 and a descending run portion 148. Water diverges from the channel stream, through both the ascending and descending run portions, to the collector well. A backwash current is directed, through the ascending run portion of the endless belt strainer, by an array of jets 149 that are mounted upon a floating carriage 150.

The traveling water screen unit 145 is a standard commercial item, such as manufactured by FMC Corporation, 3400 Walnut Street, Colmar, Pa. 18915. It is a dual-flow type designated as Model No. 57. It will be understood that backwash current directing jets such as shown in FIGS. 5 and 7 could also be used. Such jets direct a backwash current, through the ascending run 147, to dislodge material such as refuse or aquatic life from the run. The operation of the water intake screen installation 140 is similar to that previously described for the water intake screen installation 20, with the exception that water flows from the stream through both the ascending and descending runs of the endless belt strainer.

Figures 11, 12, 13:
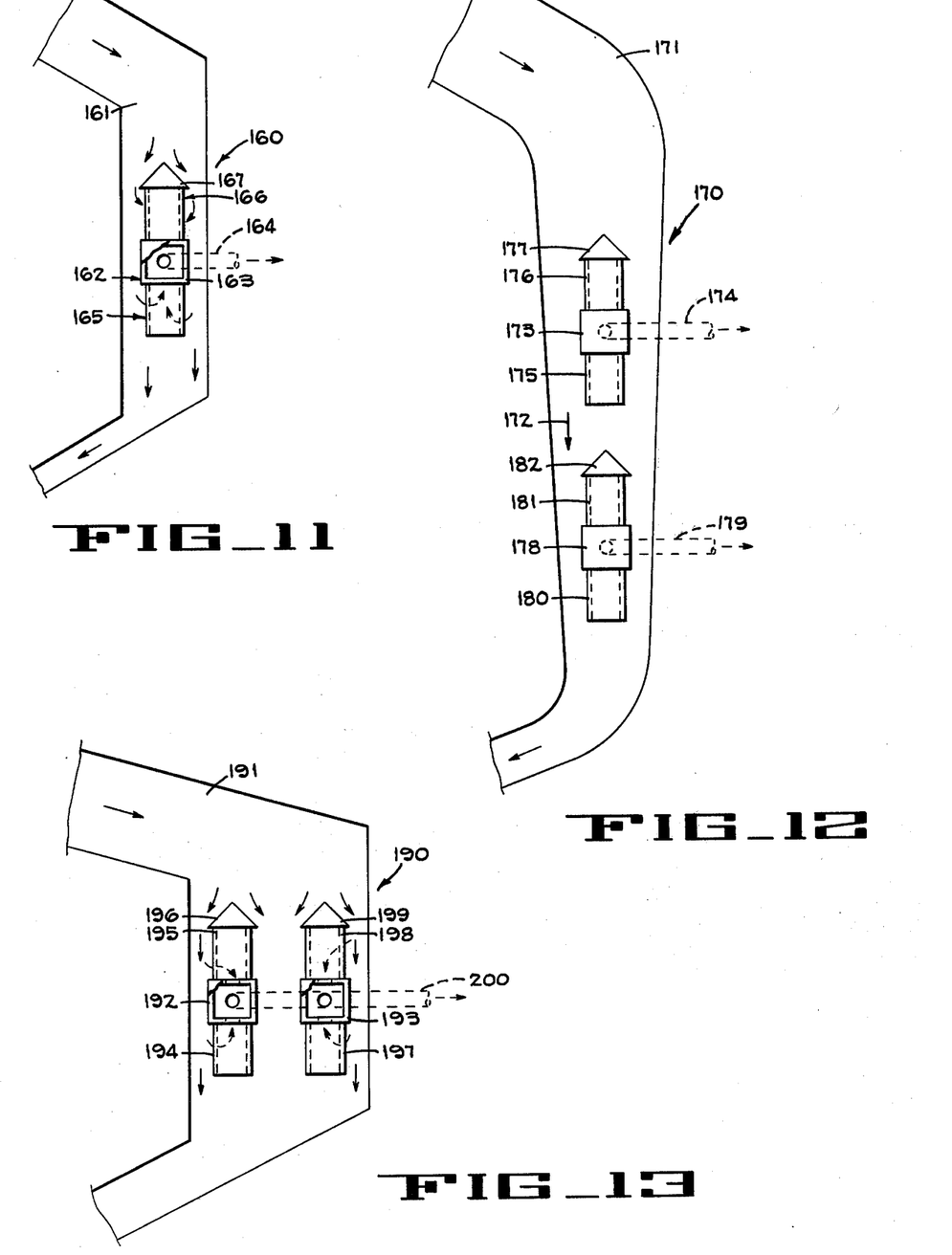
FIG. 11 is a plan view of a water intake screen installation illustrating a third embodiment of the invention.
FIG. 12 is a plan view of a water intake screen installation illustrating a fourth embodiment of the invention.
FIG. 13 is a plan view of the water screen installation illustrating a fifth embodiment of the invention.

With reference to FIG. 11, a water intake screen installation 160 has a channel 161. Within the channel is a water intake 162 that includes a collector well 163 and a conduit 164. This conduit leads to a water using facility, not shown. A traveling water screen unit 165 is located on the downstream side of the collector well, and a traveling water screen unit 166 is located on the upstream side of the collector well. A diverter cap 167 is located on the upstream side of the upstream traveling water screen unit 166. Water flowing in the channel is diverted through both ascending and descending runs of the traveling water screen unit. Refuse and aquatic life that is retained on the screen units is removed therefrom, underwater, by a backwash current from an array of directing jets, not shown. Such jets can be of the type shown in FIGS. 2, 5 or 7. Operation of this installation is similar to that previously described for installation 140.

Looking now at FIG. 12, a water screening installation 170 is shown having a channel 171 that tapers, with the width of the channel narrowing in the predetermined direction of stream flow within the channel, as indicted by the arrow 172. A first water intake collector well 173 is located within the channel and a conduit 174 extends therefrom. A traveling water screen unit 175 is located on the downstream side of the water intake collector well and a traveling water screen unit 176 is located on the upstream side of the collector well. A diverter cap 177 is located at the upstream side of the upstream traveling water screen unit 176. Another water intake collector well 178 is located within the channel at a location downstream from the first water intake collector well. A conduit 179 extends from the second collector well. A traveling water screen unit 180 is located on the downstream side of the second collector well and a traveling water screen unit 181 is located on the upstream side of the collector well. A diverter cap 182 is located on the upstream side of the upstream traveling water screen unit 181. The water intake collector wells 173 and 178 and the traveling water screen units 175, 176, 180, 181 are located in single file alignment within the channel. The taper of the channel improves the velocity of flow parallel to the ascending and descending run portions of the traveling water screen units. As water is diverted into the first collector well 173, the channel narrows so that a desired velocity of flow can be maintained past the second collector well 178 and its associated traveling water screen units 180 and 181. The traveling water screen units 175, 176, 180 and 181 are cleaned in the manner previously described for water intake screen installation 140.

With reference to FIG. 13, a water intake screen installation 190 is shown having a channel 191. Collector wells 192 and 193 are located in laterally spaced relationship within the channel. A traveling water screen unit 194 is located on the downstream side of the collector well 192 and a traveling water screen unit 195 is located at the upstream side of the same collector well. At the upstream side of the screen unit 195 is a diverter cap 196. A traveling water screen unit 197 is located at the downstream side of the collector well 193, and a traveling water screen unit 198 is located at the upstream side of this collector well. A diverter cap 199 is located at the upstream side of the upstream screen unit 198. Water diverges from the channel through the screen units into the collector wells 192 and 193 and a common conduit 200 extends from both collector wells to a water using facility, not shown. These traveling water screen units are cleaned in the manner previously described for the water intake screen installation 140.

From the foregoing description, it will be seen that the improved water intake screen installations minimize the required earth and foundation work, increase the straining capacity of the installations, reduce installation costs, avoid refuse disposal problems, protect aquatic life in the water, and clean traveling water screen units without removing from the water material that is cleaned from the screen units.

Although the best mode contemplated for carrying out the present invention has been herein shown and described, it will be apparent that modification and variation may be made without departing from what is regarded to be the subject matter of the invention.

What is claimed is:

1. A water intake screen installation comprising
a channel for guiding a stream of water to flow in a predetermined direction,
a water intake for receiving a quantity of water diverging from the channel stream,
a traveling water screen unit positioned between the water intake and the stream of water flowing in the channel for straining the diverging water,
said screen unit having an endless belt strainer in the form of a vertical loop with an upwardly extending screening surface that also extends laterally in a direction parallel to the predetermined direction of stream flow,
said screen unit having a drive for revolving the endless belt strainer to elevate a portion of the screening surface relative to the channel, and
means for directing a backwash current through the screening surface towards the stream of water flowing in the channel at an elevation above the diverging water and below the stream surface, whereby material retained on the screening surface can be dislodged by the backwash current and forced backwardly from the screening surface into the stream of water flowing in the channel to be carried away therewith,
said backwash current directing means being supported by a floating carriage.

2. The water intake screen installation described in claim 3 including a pair of vertical guides located at opposite ends of the floating carriage for maintaining the horizontal angular orientation of the carriage between the vertical guides as the carriage moves vertically.

3. The water intake installation described in claim 1 including a flexible conduit for supplying water to the backwash current directing means.

4. The water intake screen installation described in claim 1 wherein said backwash current directing means includes a plurality of jet nozzles positioned in a row that extends generally parallel to both the screening surface and the predetermined direction of stream flow, said jet nozzles directing the backwash current generally perpendicular to both the screening surface and the predetermined direction of stream flow.

5. The water intake screen installation described in claim 1 including a trash disposal trough located above the surface of the stream, and means located above the stream surface for flushing trash from the screens into the trough.

6. A water intake screen installation comprising
a channel for guiding a stream of water to flow in a predetermined direction,
a water intake for receiving a quantity of water diverging from the channel stream,
a traveling water screen unit positioned between the water intake and the stream of water flowing in the channel for straining the diverging water,
said screen unit having an endless belt strainer in the form of a vertical loop with an upwardly extending screening surface that also extends laterally in a direction parallel to the predetermined direction of stream flow,
said screen unit having a drive for revolving the endless belt strainer to elevate a portion of the screening surface relative to the channel, and
means for directing a backwash current through the screening surface towards the stream of water flowing in the channel at an elevation above the diverging water and below the stream surface, whereby material retained on the screening surface can be dislodged by the backwash current and forced backwardly from the screening surface into the stream of water flowing in the channel to be carried away therewith,
said backwash current directing means having multiple rows of jet nozzles at fixed locations, said rows being spaced vertically to cover the extreme variations of water level within the channel, and a water level sensor for actuating the row of jet nozzles that is located both below and nearest to the surface of the stream.

7. A water intake screen installation comprising
a channel for guiding a stream of water to flow in a predetermined direction,
a water intake for receiving a quantity of water diverging from the channel stream,
a traveling water screen unit positioned between the water intake and the stream of water flowing in the channel for straining the diverging water,
said screen unit having an endless belt strainer in the form of a vertical loop with an upwardly extending screening surface that also extends laterally in a direction parallel to the predetermined direction of stream flow,
said screen unit having a drive for revolving the endless belt strainer to elevate a portion of the screening surface relative to the channel, and
means for directing a backwash current through the screening surface towards the stream of water flowing in the channel at an elevation above the diverging water and below the stream surface, whereby material retained on the screening surface can be dislodged by the backwash current and forced backwardly from the screening surface into the stream of water flowing in the channel to be carried away therewith,
said backwash current directing means having a plurality of jet nozzles in a first row, first floating carriage supporting the first row of jet nozzles, a plurality of jet nozzles in a second row, a second floating carriage superimposes above the first floating carriage, said second floating carriage supporting the second row of jet nozzles, each floating carriage being movable through a predetermined vertical range, and fluid control means responsive to a water level sensor for actuating the row of jet nozzles that is located both below and nearest to the surface of the stream.

8. A water intake screen installation comprising a channel for guiding a stream of water to flow in a predetermined direction, a traveling water screen unit having an endless belt strainer in the form of a vertical loop with an ascending run portion and a descending run portion, said ascending and descending run portions extend from near the bottom of the channel to a location above the surface of the stream, said screen unit having a rotatable drive for revolving the endless belt strainer to elevate the ascending run portion and to lower the descending run portion, both said ascending run portion and said descending run portion being contiguous with the stream of water flowing in the channel, both run portions extending laterally parallel to the predetermined direction of stream flow, a water intake located to receive dual quantities of water diverging from the channel stream, one quantity passing through the ascending run portion and the other quantity passing through the descending run portion, and means for directing a backwash current through the ascending run portion of the endless belt strainer in a direction towards the stream of water flowing in the channel at an elevation below the stream surface, whereby material retained on the ascending run portion of the endless belt strainer can be dislodged by the backwash current and forced backwardly from the ascending run portion into the stream of water flowing in the channel to be carried away therewith.

9. The water intake screen installation described in claim 8 wherein said water intake includes a collector well that is located within the channel, said traveling water screen unit being located on the downstream side of the collector well, and a diverter cap positioned on the upstream side of the collector well.

10. The water intake screen installation described in claim 8 wherein said water intake includes a collector well that is located within the channel, said installation further including another traveling water screen unit, one screen unit being located on the upstream side of the collector well and the other screen unit being located on the downstream side of the water intake, and a diverter cap located at the upstream side of the upstream traveling water screen unit.

11. The water intake screen installation described in claim 10 including another water intake collector well located within the channel, another pair of traveling water screen units located on the upstream and downstream sides of the last mentioned collector well, said water intake collector wells being located in laterally spaced relationship within the channel.

12. The water intake screen installation described in claim 10 including another water intake collector well located within the channel, another pair of traveling water screen units located on upstream and downstream sides of the last mentioned collector well, said water intake collector wells and said traveling water screen units being located in single file alignment.

13. The water intake screen installation described in claim 12 wherein said channel tapers in the predetermined direction of stream flow with the channel, said channel having a width that narrows in the direction of stream flow to improve the velocity of flow parallel to the run portions of the screen units.

14. In a water intake screen installation having a channel for guiding a stream of water to flow in a predetermined direction, and a water intake for receiving a quantity of water diverging from the channel stream, a traveling water screen unit that is positioned between the channel stream and the water intake for straining the diverging water, said traveling water screen unit having a screening surface that is contiguous with the stream of water flowing in the channel, said screening surface having a straining area that extends in a lateral direction parallel to the predetermined direction of stream flow and in an upward direction from near the bottom of the channel to above the surface of the stream, said traveling water screen unit having a rotatable drive for elevating a portion of the screening surface relative to the channel, the improvement comprising means for directing a backwash current through the screening surface towards the stream of water flowing in the channel at an elevation below the stream surface and above the diverging water, whereby material retained on the screening surface can be dislodged therefrom by the backwash current and forced backwardly from the screening surface into the stream of water flowing in the channel to be carried away therewith.

15. In a method of straining water from a stream including the steps of guiding a stream of water to flow in a predetermined direction, drawing a quantity of water to diverge laterally from the predetermined direction of flow of the stream of water, straining the diverging quantity of water with a screening surface of an endless belt strainer, and vertically shifting the endless belt strainer screening surface from a location through which the diverging water flows to an adjacent location superposed to the diverging water flow, the improvement comprising directing a submerged backwash current to flow through the screening surface at the superposed location in a direction towards the guided stream of water and in the opposite direction from the direction of flow of the diverging water, whereby material retained on the screening surface can be dislodged therefrom by the backwash current and forced backwardly from the screening surface into the flowing stream to be carried away therewith.

16. The method described in claim 15 wherein the diverging quantity of water and the submerged backwash current flow simultaneously in opposite directions through the screening surface at locations where the backwash current is above the diverging quantity of water.

* * * * *